United States Patent
Arceno et al.

(10) Patent No.: US 11,314,216 B2
(45) Date of Patent: Apr. 26, 2022

(54) REMOTE DEPLOYMENT AND COMMISSIONING OF WORKSTATIONS WITHIN A DISTRIBUTED CONTROL SYSTEM

(71) Applicant: FISHER-ROSEMOUNT SYSTEMS, INC., Round Rock, TX (US)

(72) Inventors: Christopher Arceno, Rizal (PH); Joseph Anton T. Reyes, Quezon (PH); Anthony Jason Bacolod, Manila (PH); Cristopher Ian Sarmiento Uy, Metro Manila (PH)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 46 days.

(21) Appl. No.: 16/863,527

(22) Filed: Apr. 30, 2020

(65) Prior Publication Data
US 2021/0341891 A1 Nov. 4, 2021

(51) Int. Cl.
*G05B 19/042* (2006.01)
*G06F 8/60* (2018.01)

(52) U.S. Cl.
CPC ............ *G05B 19/042* (2013.01); *G06F 8/60* (2013.01); *G05B 2219/23051* (2013.01); *G05B 2219/25232* (2013.01)

(58) Field of Classification Search
None
See application file for complete search history.

(56) References Cited

U.S. PATENT DOCUMENTS

| | | | | |
|---|---|---|---|---|
| 6,449,715 B1* | 9/2002 | Krivoshein | ........... | H04L 41/022 713/1 |
| 11,054,974 B2* | 7/2021 | Naidoo | ................ | G05B 19/409 |
| 2003/0004952 A1* | 1/2003 | Nixon | ................ | G05B 19/4145 |
| 2004/0060044 A1* | 3/2004 | Das | ..................... | G06F 11/3672 717/171 |
| 2009/0172195 A1* | 7/2009 | Risbud | .................. | H04L 69/162 709/245 |

(Continued)

OTHER PUBLICATIONS

Search Report for Application No. GB21 05633.8, dated Jan. 11, 2022.

*Primary Examiner* — Philip Wang
(74) *Attorney, Agent, or Firm* — Marshall, Gerstein & Borun LLP

(57) ABSTRACT

A method and a system facilitate remote commissioning of workstations for controlling, maintaining, and/or configuring process control field devices in a process control plant. Using a configuration workstation coupled to the workstation by a communication network, a user may specify a configuration for the workstation in software and, upon selecting the workstation for commissioning, can effect configuration of the workstation, according to the specified configuration, remotely from the configuration workstation. Effecting configuration of the workstation may include installing/updating an operating system, installing/updating an operator, maintenance, or configuration interface application, and/or installing/updating a process plant configuration. Upon completion of the configuration, the workstation is operable to communicate with a process controller to implement control, maintenance, and/or configuration of the process control plant.

22 Claims, 5 Drawing Sheets

(56) References Cited

U.S. PATENT DOCUMENTS

| | | | |
|---|---|---|---|
| 2009/0228611 A1 | 9/2009 | Ferguson et al. | |
| 2010/0305720 A1* | 12/2010 | Doll | G05B 19/042 |
| | | | 700/86 |
| 2010/0305721 A1* | 12/2010 | Kostadinov | G05B 19/0426 |
| | | | 700/87 |
| 2011/0007665 A1 | 1/2011 | Dinar | |
| 2012/0017157 A1* | 1/2012 | Bush | G06Q 10/06 |
| | | | 715/736 |
| 2013/0326494 A1* | 12/2013 | Nunez | H04L 67/34 |
| | | | 717/172 |
| 2015/0347935 A1* | 12/2015 | Standing | G05B 19/042 |
| | | | 705/7.27 |
| 2018/0101152 A1* | 4/2018 | Jundt | G05B 19/041 |
| 2018/0364686 A1* | 12/2018 | Naidoo | G05B 19/0426 |
| 2019/0049932 A1* | 2/2019 | Naidoo | G06F 8/65 |
| 2019/0101899 A1* | 4/2019 | Enver | G05B 19/418 |
| 2019/0102072 A1* | 4/2019 | Strinden | G06F 3/0483 |
| 2019/0102074 A1* | 4/2019 | Uy | G06F 3/04845 |

* cited by examiner

REMOTE DEPLOYMENT AND COMMISSIONING OF WORKSTATIONS WITHIN A DISTRIBUTED CONTROL SYSTEM

FIELD OF THE DISCLOSURE

The present disclosure is related to the field of process control systems and, more particularly, to a system and a method that enables remote commissioning of one or more computer workstations within a distributed control system.

BACKGROUND

Distributed control systems (DCS) are used in a variety of process industries including chemical, petrochemical, refining, pharmaceutical, food and beverage, power, cement, water and wastewater, oil and gas, pulp and paper, and steel, and are used to control batch, fed-batch, and continuous processes operating at a single site or at remote locations. Process plants typically include one or more process controllers communicatively coupled to one or more field devices via analog, digital or combined analog/digital buses, or via a wireless communication link or network. Collectively, the various devices perform monitoring, control, and data collection functions to control the process, safety shutdown systems, fire and gas detection systems, machine health monitoring systems, maintenance systems, decision support, and other systems.

The field devices, which may be, for example, valves, valve positioners, switches and transmitters (e.g., temperature, pressure, level and flow rate sensors), are located within the process environment and generally perform physical or process control functions such as opening or closing valves, measuring process parameters, etc. to control one or more process executing within the process plant or system. Smart field devices, such as the field devices conforming to the well-known Fieldbus protocol may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as HART®, WirelessHART®, and FOUNDATION® Fieldbus field devices. The control modules in the controller send the control signals over the communication lines or links to the field devices to thereby control the operation of at least a portion of the process plant or system.

Information from the field devices and the controller is usually made available over a data highway to one or more other hardware devices, such as operator workstations, personal computers or computing devices, data historians, report generators, centralized databases, or other centralized administrative computing devices that are typically placed in control rooms or other locations away from the harsher plant environment. Each of these hardware devices typically is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers and field devices may include a wired communication path, a wireless communication path, or a combination of wired and wireless communication paths.

As an example, the DeltaV™ control system, sold by Emerson Process Management, includes multiple applications stored within and executed by different devices located at diverse places within a process plant. A configuration application, which resides in one or more workstations or computing devices, enables users to create or change process control modules and download these process control modules via a data highway to dedicated distributed controllers. Typically, these control modules are made up of communicatively interconnected function blocks, which are objects in an object oriented programming protocol that perform functions within the control scheme based on inputs thereto and that provide outputs to other function blocks within the control scheme. The configuration application may also allow a configuration engineer to create or change operator interfaces which are used by an operator interface application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The operator interface applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any of a number of different views, such as an operator's view, an engineer's view, a technician's view, etc. The operator workstations are generally located away from the harsh process plant environment. As a result the operator workstations may be remotely located in various areas of the process plant.

A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

A process plant may have a multiplicity of operator, maintenance, and process plant configuration workstations each facilitating, respectively, control over, maintenance of, and commissioning of separate portions of the process plant and, accordingly, each located remote from one another and from a workstation on which the configuration application, used to configure the various types of workstations, resides. Commissioning these remote workstations is a time-consuming task, both individually and system-wide. To commission a remote workstation a user, for example a process configuration engineer, must physically visit each remote workstation and perform the commissioning operation onsite at each remote workstation. Because the remote workstations may be located at various parts of a large plant, and may be distant from one another as well, the user may be unable to easily access these remote workstations.

FIG. 1 illustrates an example of a prior art DCS 100 and depicts a network of geographically dispersed and remotely located computer workstations 122, a configuration workstation 120, and a process controller 134, all communicatively coupled via a communication network 136. The remote workstations 122 are located far from one another and far from the configuration workstation 120, and may also not be easily accessible. For these reasons, a user 104 who typically works at the configuration workstation 120 would be inconvenienced, in terms of both time and effort, if required to physically visit each remote workstation 122. Nevertheless, in prior art DCS configurations, that is precisely what is required in order to commission the remote workstations 122.

The user 104 may be a process engineer or a process configuration engineer. Throughout this specification, the terms user, process engineer, or process configuration engineer are used interchangeably. The process configuration engineer 104 is generally responsible for developing a process plant configuration 128 at, for example, the configuration workstation 120. Alternatively, the necessary process plant configuration 128 may already have been developed and the user 104 merely needs to retrieve this configuration from the digital storage of the configuration workstation 120.

Generally, the process plant configuration 128 is configured to be executed by one or more controllers and by one or more workstations that, in cooperation with the controllers, operate to control at least a portion of the process plant. The process plant configuration 128 executing on the remote workstations 122 generally executes in a distributed control software environment, such as the DeltaV™ process controller application software offered by the Emerson corporation. Of course, the distributed control software environment itself is typically executing within a workstation operating system. Thus, configuring one of the workstations 122 may at times require installing and/or configuring an operating system, installing and/or configuring various system components necessary for the distributed control software environment, installing and/or configuring the distributed control software environment, and installing and/or configuring the process plant configuration necessary to execute control of the process plant. Configuring the workstations 122 may require configuring additional configuration workstations 120, and/or configuring maintenance workstations.

The configuration workstation 120 is a computer workstation that includes the process development and process management software tools that the process configuration engineer 104 uses to develop the process plant configuration 128 that the process configuration engineer 104 wants to deploy onto the remote workstation(s) 122 in order to commission the remote workstation 122, that is, to make the remote workstation(s) 122 fully operational for the purpose of monitoring and controlling the DCS 100, in the case of an operator workstation, for the purpose of configuring the process plant, in the case of an additional configuration workstation, and/or for the purpose of performing maintenance activities, in the case of a maintenance workstation.

In the case of configuring an operator workstation, for example, after the user 104 has developed, at the configuration workstation 120, the necessary process plant configuration 128, the user 104 must transfer this process plant configuration 128 onto a mobile computer storage medium 130. It is also possible that the necessary process plant configuration 128 has been already developed at a previous time and already resides within the computer of the configuration workstation 120. In this case the user needs to retrieve this process plant configuration 128 from the digital storage of the configuration workstation 120 and put the process plant configuration 128 onto a mobile computer storage medium 130. The mobile computer storage medium 130 may be any known mobile computer storage medium 130 including, without limitation, USB drives, CD- and/or DVD-ROM media, secure digital (SD) cards, and the like, but a wide variety of other mobile computer storage mediums could also be used for this purpose.

The process configuration engineer 104 may have developed different types of process plant configuration 128 for different areas of the process plant, for example, and may wish to deploy a different type or a different version of the process plant configuration 128 to different ones of the remote workstations 122. In this disclosure, the term process plant configuration 128 refers to all different types and different versions of process plant configuration 128 that the process configuration engineer 104 may have developed, may develop, or may be developing at the configuration workstation 120.

After the user 104 has copied the process plant configuration 128 onto the mobile computer storage medium 130, the user 104 leaves the configuration workstation 120 and carries the mobile computer storage medium 130 to the particular remote workstation 122 the user intends to commission. The user 104 could walk, ride, drive, or otherwise travel (indicated by the pathway 140) from the configuration workstation 120 to the remote workstation 122. The user 104 may also give the mobile storage medium 130 to a different person for transportation to the remote workstation 122. Either way someone, by some means, carries or transports the mobile storage medium 130 from the configuration workstation 120 to the remote workstation 122.

Once the user 104 is at the remote workstation 122 with the mobile computer storage medium 130, the user 104 transfers the process plant configuration 128 from the mobile computer storage medium 130 to the remote workstation 122 and installs the process plant configuration 128 onto the computer of the remote workstation 122. This process of downloading the process plant configuration 128 and installing the process plant configuration 128 onto the remote workstation 122 takes significant time (indicated by the clock or timer 138) at the remote workstation 122. At times, it may be necessary not just to install the process plant configuration 128 to the remote workstation 122, but also to install or configure the operating system, the system components, and/or the distributed control software environment in which the process plant configuration 128 operates.

During this commissioning process (which may include the entirety of installing and configuring each of the operating system, the system components, the distributed control software environment, and the process plant configuration 128), the user 104 must generally wait at the remote workstation 122 in order to finish the downloading and the installation processes of the operating system, the distributed control software environment, etc., which may require the user 104 to be physically present at the remote workstation 122, and to wait, during the entire downloading and installation processes because, throughout the downloading and the installation processes, one or multiple actions may be required by the user 104. For example, the remote workstation 122 may prompt the user 104 to acknowledge reboots multiple times during the installation process of the operating system or during the installation process of the distributed control software environment. For this reason, the user 104 must not only remain at a particular remote workstation 122 for a period of time, but the user 104 must stay focused on the installation process, at least until all the reboots have been successfully completed.

Where the commissioning process requires installation, first, of the distributed control software environment, that installation is merely a prerequisite step to installation of the process plant configuration 128, which comes in the form of a configuration file from or created within a configuration application (e.g., the ProPlus™ configuration software offered by Emerson). During this phase of the remote workstation commissioning process, the user 104 at the remote workstation 122 may be required to go back to the configuration workstation 120, open the configuration application, and then create and configure a workstation placeholder, which could be a virtual logical device. The user then exports the placeholder and copies it to the mobile computer storage medium 130 and once again carries the mobile computer storage medium 130 back to the remote workstation 122, at which time the user 104 copies the workstation placeholder onto the remote workstation 122 that the user is trying to commission and imports the placeholder using an installation program. More waiting ensues, as the user 104 remains physically present at the remote workstation 122 to acknowledge further reboots and to provide supplemental information when prompted by the installation program. The user then returns to the configuration workstation 120, and downloads the workstation to connect it to the system.

While described above with respect to commissioning of an example operator workstation, similar sets of steps are required for the commissioning of a maintenance workstation or a further configuration workstation, though the particular software components and programming may vary, the overall process is largely the same inasmuch as it requires transportation of the configuration to the remote workstation, and attention of the operator during the commissioning and installation process in order to perform various tasks and reboot operations during the commissioning.

As illustrated above with reference to FIG. 1, in order to configure and commission the remote workstations 122 the user 104 typically makes several trips between the configuration workstation 120 and the remote workstation 122, and must physically wait at each remote workstation 122 while each remote workstation 122 is configured and commissioned. This installation process has to be repeated in a serial fashion for multiple remote workstations 122 that are located at multiple locations with the DCS 100. This way of commissioning multiple remote workstation is highly time consuming and inefficient.

SUMMARY OF THE DISCLOSURE

A system for facilitating remote commissioning of selected workstations in a process control plant includes a plurality of process control field devices operating to process physical materials in the process plant to produce a product. A process controller coupled to the plurality of process control field devices is configured to receive first signals from the process control field devices and to send control signals to the process control field devices. The system includes a communication network and a configuration workstation coupled to the communication network, the configuration workstation including a processor and a memory coupled to the processor, the memory storing machine-readable instructions, executable by the processor. The machine-readable instructions are executed by the processor to provide a graphical configuration system operable by a user to create control modules and function blocks for controlling the process control field devices, and to download the control modules and function blocks to the process controller to implement control of the process control field devices. The machine-readable instructions are executed by the processor to receive from a user a specified configuration for a workstation coupled to the communication network, to receive a selection of the workstation from a plurality of workstations coupled to the communication network, and to cause the selected workstation to be configured according to the specified configuration, such that the workstation is operable to communicate with the process controller to implement configuration, operational, and/or maintenance functions within the process control plant.

A method for remotely commissioning an operator workstation in a process control plant includes creating, in a configuration editor of a graphical configuration system operating on a configuration workstation, a process configuration for the process control plant, the configuration for the process plant specifying a process controller, a plurality of process control field devices, and a control strategy for implementation by the process controller to control the plurality of process control field devices. The method also includes specifying, in the configuration editor, a configuration of an operator workstation to be commissioned to control the process plant, and searching a communication network communicatively coupled to the configuration workstation to identify one or more decommissioned operator workstations. Further, the method includes receiving a selection of one of the decommissioned operator workstations identifying the selected decommissioned operator workstation as the operator workstation to be commissioned, and causing the selected decommissioned operator workstation to be configured according to the specified configuration of the operator workstation to be commissioned, such that the operator workstation is operable to communicate with the process controller to implement control of the process control field devices and to receive operational data of the process control plant.

DETAILED DECRYPTION

The presently described embodiments provide for a process and system in which a configuration engineer or other user is capable of commissioning and configuring a workstation (e.g., an operator workstation, a maintenance workstation, an additional configuration workstation) remotely from a configuration workstation. In contrast with prior art systems, in which a user was required to travel to each of the remote workstations, sometimes multiple times, and to participate actively in responding to various prompts during the commissioning process, the presently described embodiments allow the user to configure and commission remote workstations without being physically present at the remote workstations, saving time and, potentially, allowing a single user to configure and commission multiple remote workstations simultaneously or, at least, in parallel.

Figure 1:
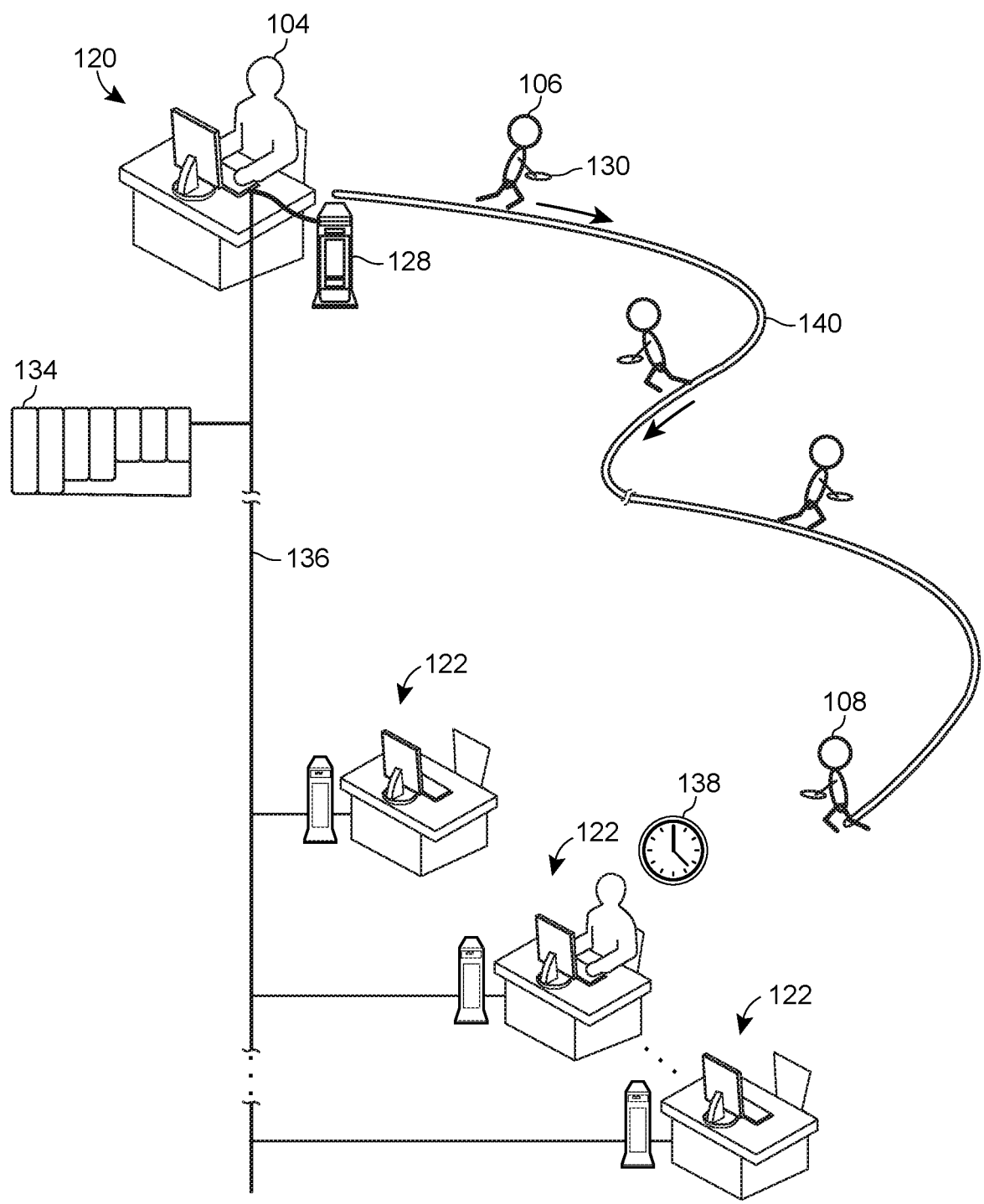
FIG. 1 is an illustration of a Distributed Control System (DCS) including a configuration workstation and a network of multiple remote computer workstations.
Figure 2:
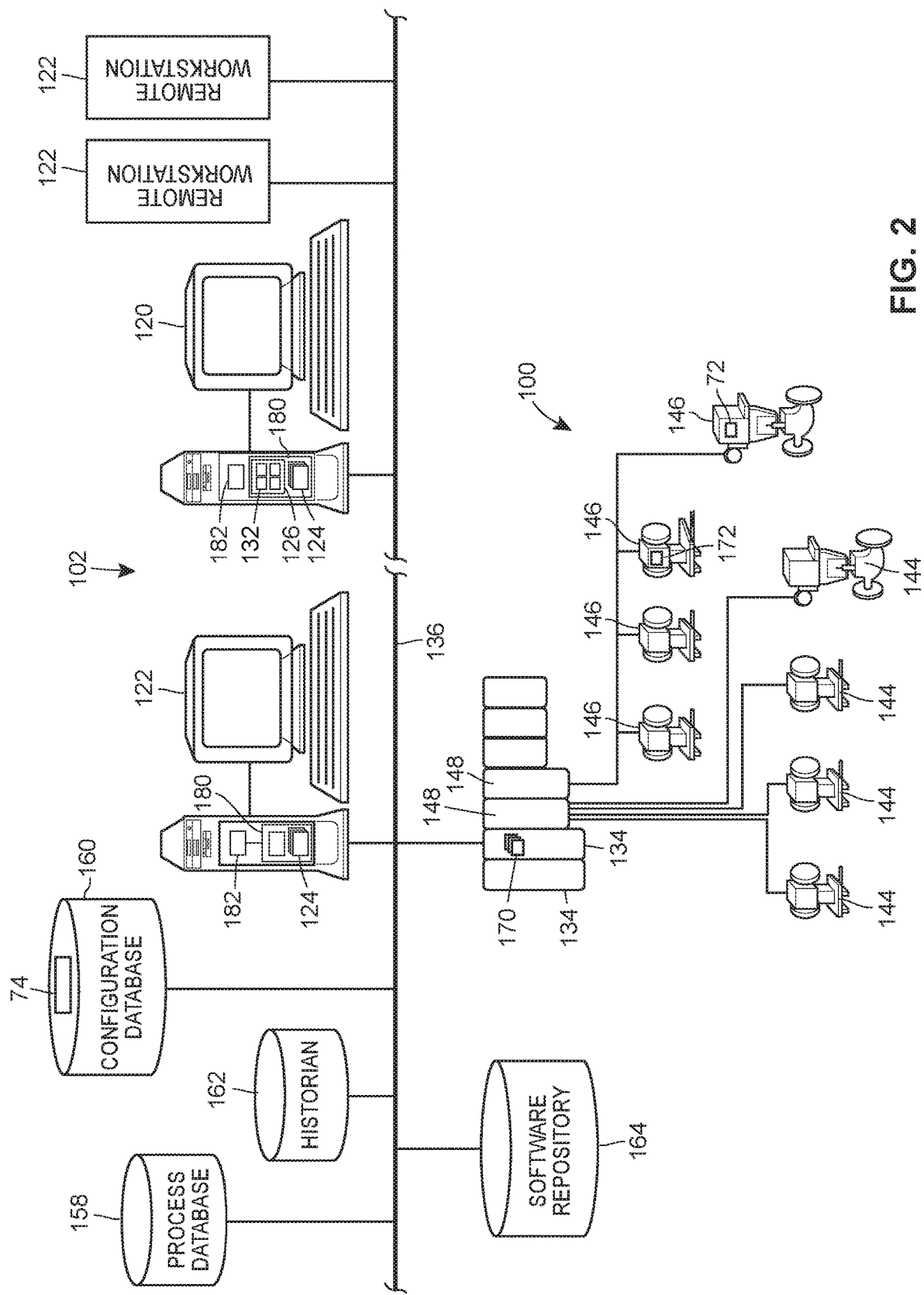
FIG. 2 is an illustration of an example process plant according to the present description.

FIG. 2 illustrates an example process plant network 102 configured to facilitate remote commissioning and configuration of remote workstations 122. As will be described in detail herein, the remote workstations 122 (so referred to herein because they are typically remote from one another and from a configuration workstation 120) may be configured from the configuration workstation 120 without necessitating user intervention or presence at the remote workstations 122, thus saving both time and effort on behalf of the personnel tasked with commissioning the operator workstations 122. While described herein primarily in terms of the configuration of remote workstations 122 that are operator workstations, the remote workstations 122 may also be additional configuration workstations and/or maintenance workstations, the primary difference being the interface application software that is installed on each.

With respect to operation of the process plant via operator workstations, plant personnel generally utilize one or more operator interface applications 124 to supervise or control the operation of the process plant 102 and the distributed control system (DCS) 100 implemented within the process plant 102. The operator interface applications 124 generally include a user interface application that uses various different displays to graphically depict process graphics to each of the operator and the maintenance technician and/or other users at workstations, such as a workstation 122.

The process plant environment of FIG. 2 also includes a graphical configuration system 126 operating on a configuration workstation 120. The graphical configuration system 126 generally facilitates the creation of control and monitoring schemes, including graphical displays, for control of the process plant. The graphical configuration system 126 may include, for example, a configuration editor 132 that can be used to create control modules and control module templates, graphical displays and templates, and other aspects of the control system, that are stored in a library, and that can be subsequently used to create instances or usages that are actually executed in the control of the process plant by downloading instances of the control modules to a controller, or by executing instances of the graphical displays in user displays presented to, for example, the operator and maintenance person, during operation of the plant 102. Of course, each of the graphical configuration system 126, the configuration editor 132, and the various control modules, templates, and graphical displays (referred to herein collectively as "configuration software") may be stored in a tangible computer readable memory or medium and execute on one or more processors to perform the functions described herein.

As is typical, the distributed process control system 100 illustrated in FIG. 2 has one or more controllers 134, each of which is connected to one or more field devices 144 and 146 (which may be smart devices) via input/output (I/O) devices or cards 148 which may be, for example, Fieldbus interfaces, Profibus interfaces, HART interfaces, standard 4-20 ma interfaces, etc. The controllers 134 are also coupled to the one or more host or operator workstations 122 via a data highway or communication network 136 which may be, for example, an Ethernet link. A process data database 158 may be connected to the communication network 136 and operates to collect and store process variable, process parameter, status and other data associated with the controllers 134, field devices 144, 146 and any other devices within the plant 102. During operation of the process plant 102, the process database 158 may receive process data from the controllers 140 and, indirectly, the field devices 144, 146 via the communication network 136.

A configuration database 160 stores the current configuration of the distributed control system 100 within the plant 102 as downloaded to and stored within the controllers 140 and field devices 144, 146. The configuration database 160 stores process control functions defining the one or several control strategies of the distributed control system 100, configuration parameters of the devices 144, 146, the assignment of the devices 144, 146 to the process control functions, and other configuration data related to the process plant 102. The configuration database 160 may additionally store graphical objects or user displays as well as configuration data associated with these objects or displays to provide various graphical representations of elements within the process plant 102. Some of the stored graphical objects may correspond to process control functions (e.g., a process graphic developed for a certain PID loop), and other graphical objects may be device-specific (e.g., a graphic corresponding to a pressure sensor).

A data historian 162 (another database) stores events, alarms, comments and courses of action taken by operators. The events, alarms, and comments may pertain to individual devices (e.g., valves, transmitters), communication links (e.g., wired Fieldbus segments, WirelessHART communication links), or process control functions (e.g., a PI control loop for maintaining a desired temperature set point). Further, a software repository 164 may store installation files and software files that may be required for commissioning one or more of the remote workstations 122, including installation files related to operating systems, installation files related to operator interface applications 124, installation programs for facilitating installation of multiple components, and the like, as will be described herein.

Each of the databases 158-164 may be any desired type of data storage or collection unit having any desired type of memory and any desired or known software, hardware or firmware for storing data. Of course, the databases 158-164 need not reside in separate physical devices. Thus, in some embodiments, some of the databases 158-164 may be implemented on a shared data processor and memory. In general, it is also possible to utilize more or fewer databases to store the data collectively stored and managed by the databases 158-164 in the example system of FIG. 2.

While the controllers 134, I/O cards 148 and field devices 144, 146 are typically located down within and distributed throughout the sometimes harsh plant environment, the configuration and operator workstations 120 and 122, respectively, and the databases 158-164 are usually located in control rooms or other less harsh environments easily assessable by controller, maintenance, and various other plant personnel.

As is known, each of the controllers 134, which may be, by way of example, the DeltaV™ controller sold by Emerson Process Management, stores and executes a controller application that implements a control strategy using any number of different, independently executed, control modules or blocks 170. Each of the control modules 170 can be made up of what are commonly referred to as function blocks wherein each function block is a part or a subroutine of an overall control routine and operates in conjunction with other function blocks (via communications called links) to implement process control loops within the process plant 102. As is well known, function blocks, which may be objects in an object oriented programming protocol, typically perform one of an input function, such as that associated with a transmitter, a sensor or other process parameter measurement device, a control function, such as that associated with a control routine that performs PID, fuzzy logic, etc., control, or an output function that controls the operation of some device, such as a valve, to perform some physical function within the process plant 102. Of course hybrid and other types of complex function blocks exist, such as model predictive controllers (MPCs), optimizers, etc. While the Fieldbus protocol and the DeltaV system protocol use control modules and function blocks designed and implemented in an object oriented programming protocol, the control modules could be designed using any desired control programming scheme including, for example, sequential function block, ladder logic, etc., and are not limited to being designed and implemented using the function block or any other particular programming technique. Each of the controllers 134 may also support the AMS® suite of applications sold by Emerson Process Management and may use predictive intelligence to improve availability and performance of production assets including mechanical equipment, electrical systems, process equipment, instruments, non-smart and smart field devices 144, 146, etc.

As described, the DCS 100 includes one or more of the controllers 134 communicatively coupled to the workstation(s) 120, 122 in the control room(s). The controllers 134 automate control of the field devices 144, 146 in the process area by executing process control strategies implemented via the operator workstations 122. An example process strategy involves measuring a pressure using a pressure sensor field device and automatically sending a command to a valve positioner to open or close a flow valve based on the pressure measurement. The I/O cards 148 translate information received from the field devices 144, 146 to a format compatible with the controllers 134 and translate information from the controllers 134 to a format compatible with the field devices 144, 146.

Through the I/O cards 148, the controller 134 may communicate with the field devices 144, 146 according to the control modules 170 that have been downloaded to the controller 134. The control modules 170 are programmed using the configuration editor 132 executing on the configuration workstation 120. In the configuration editor 132, a configuration engineer 104 may create the control modules 170 by, for instance, instantiating one or more function blocks. By way of example, the configuration engineer 104 may instantiate an AI function block to receive an analog input from one of the field devices 144, 146, which AI function block may receive a variety of values (e.g., a signal value, alarm hi and low limits, a signal status, etc.) associated with the analog output of the field device 144, 146. The AI function block may output a corresponding signal to another function block (e.g., a proportional-integral-derivative (PID) control function block, a custom function block, a display module, etc.) Once the AI function block is instantiated, associating the function block with a unique device tag associated with the field device 144, 146 will cause the function block, once downloaded to the controller 134, to cooperate with the appropriate I/O card 148 to process information from the correct field device 144, 146.

In the plant network 102 illustrated in FIG. 2, the field devices 144, 146 connected to the controllers 134 may be standard 4-20 ma devices, may be smart field devices, such as HART®, Profibus, or FOUNDATION® Fieldbus field devices, which include a processor and a memory, or may be any other desired type of devices. Some of these devices, such as Fieldbus field devices (labeled with reference number 146 in FIG. 2), may store and execute modules, or sub-modules, such as function blocks, associated with the control strategy implemented in the controllers 134 or which perform other actions within the process plant, such as data collection, trending, alarming, calibration, etc. Function blocks 172, which are illustrated in FIG. 2 as being disposed in two different ones of the Fieldbus field devices 146, may be executed in conjunction with the execution of the control modules 170 within the controllers 134 to implement process control, as is well known. Of course, the field devices 144, 146 may be any types of devices, such as sensors, valves, transmitters, positioners, etc., and the I/O devices 148 may be any types of I/O devices conforming to any desired communication or controller protocol such as HART, Fieldbus, Profibus, etc.

With continued reference to FIG. 2, the workstations 120 and 122 may include various applications that are used for various different functions performed by the personnel within the plant 102. Each of the workstations 120 and 122 includes a memory 180 that stores various applications, programs, data structures, etc., and a processor 182 which may be used to execute any of the applications stored in the memory 180. In the example illustrated in FIG. 2, the workstation 120 also includes, in addition to the operator interface applications 124, one or more process controller configuration applications as part of the configuration editor 132 which may include, for example, control module creation applications, operator interface applications and other data structures which can be accessed by any authorized configuration engineer to create and download control routines or modules, such as the control modules 170 and the function blocks 172, to the various controllers 134 and devices 146 of the plant 102.

Broadly speaking, the operator interface application 124 allows operators to view display modules configured to provide specific information about the operation of specific areas of the process plant 102, and to control the operation of the process plant 102 according to the information on the display modules. The display modules are rendered on the workstations 120, 122, and incorporate real-time process data received from the controllers 134 and the field devices 144, 146. As used herein, "real-time" communication of data refers to electronic communication of data through electronic communication networks with ordinary delays for processing, routing, and transmission, without the intentional introduction of additional non-trivial delays. In some embodiments, trivial delays of less than five seconds (and preferably less than two seconds) may be introduced to reduce network congestion when communicating data in real-time. The display modules may be any type of interface that, for example, enables an operator or other use to manipulate data values (e.g., perform reads or writes) to monitor or alter operation of the field devices 144, 146, the control modules 170 and function blocks 172, and the DCS 100 and process plant 102 as a whole. The display modules may be stored in the memory 180 of the workstations 120, 122, and may also be stored in the configuration database 160.

The control modules 170 and, in some embodiments, the display modules may be part of a configuration file 174 in the configuration database 160. That is, the control modules 170 may be stored in the configuration file 174 together with the display modules or separately from the display modules. In any event, the configuration file 174 generally stores the entire configuration of the DCS 100, including devices, device tags, friendly names, data formatting information (e.g., scaling information, unit types, etc.) which variables are associated with each control loop, the control strategies defined, etc. As indicated previously, the configuration file 174 may also be downloaded to the controllers 134 to implement the control strategies defined in the configuration file 174.

As will be appreciated, the process plant 102 may include many hundreds, thousands, or even tens of thousands of signals, output from transmitters (i.e., sensors) on hundreds or thousands of field devices 144, 146, and/or input to those field devices 144, 146 to cause the field devices 144, 146 to perform control functions according to the control strategies programmed into the control modules 170. The plant 102 may be divided into different areas, multiples of which areas may be controlled by a single controller 134, each of which areas may be controlled by a single controller or multiple controllers 134, or some combination. In any event, the field devices 144, 146 that make up the process plant 102 are likely to be duplicated individually many times over in the process plant 102 (e.g., there may be many of any type of valve, many pumps, many heaters, many tanks, etc.). The field devices 144, 146 may also be combined into functional groups within a physical area ("process areas"), in which the field devices 144, 146 in that process area perform a specific portion of the overall process. For instance, a particular process area may have the equipment for generating steam for other parts of the process. Within the process areas, there may be duplicated pieces or groups of equipment ("process units") that share a similar construction and function. As an example, a process unit in the steam generation process area may include a boiler and a turbo generator, and the process area may include multiple instances of this process unit.

Figure 3:
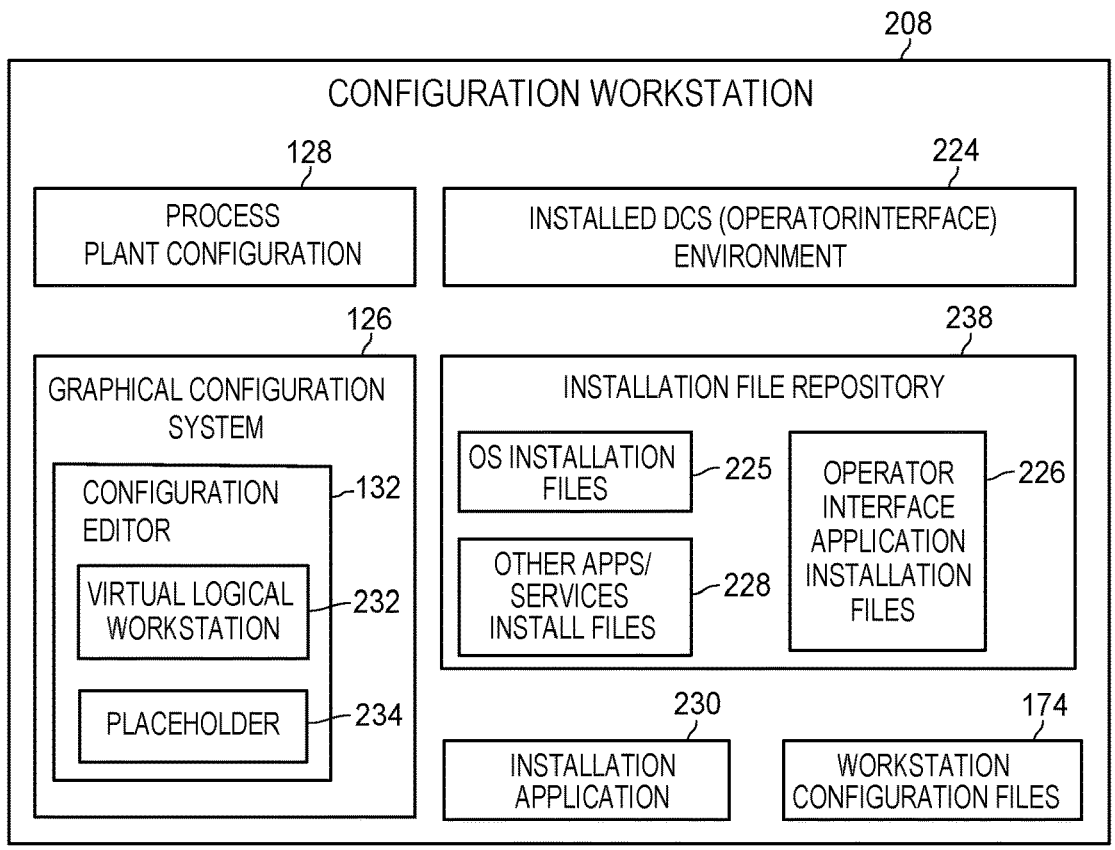
FIG. 3 is a block diagram illustrating some of the software elements present on a configuration workstation.
Figure 4:
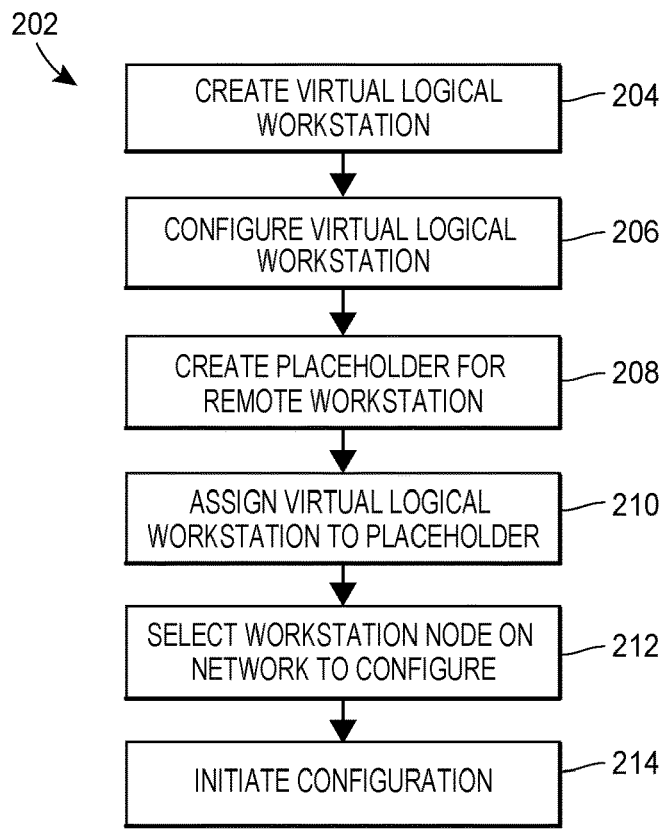
FIG. 4 is a flow chart illustrating a workflow for preparing a configuration that will be used to commission a remote operator workstation in accordance with described embodiments.

FIGS. 3 and 4 are, respectively, a block diagram 200 illustrating some of the software elements present on the configuration workstation 120 according to the present description, and a flow chart illustrating a workflow 202 for preparing a configuration that will be used to commission a remote operator workstation 122 in accordance with the presently described embodiments.

In addition to the process plant configuration 128, the configuration workstation 120 may also include a configuration environment 126 (e.g., the ProPlus™ configuration software offered by Emerson), including a configuration editor 132 in which the configuration engineer 104 may create the process plant configuration 128. Various other applications may also be present on the configuration workstation 120, including, for example, an installed copy 224 of the operator interface applications 124, installation files 225 for installing an operating system on other workstations, installation files 226 for installing the operator interface applications 124 on other workstations, installation files 228 for other applications and services that may be installed on other workstations, and the like. Alternatively, the various installation files 225, 226, 228, may be stored outside of the configuration workstation 120 in, for example, the software repository database 164 or other digital storage (not shown) accessible through the communication network 136. The configuration workstation 120 may also include an installation application 230, as described below.

In described embodiments, the process configuration engineer 104 enters a remote workstation configuration workflow 202 within the graphical configuration system 126 and within the graphical configuration system 126 creates a virtual logical workstation 232 that represents a particular remote workstation 122 to be commissioned (block 204). (Until the commissioning process is complete, a given remote workstation 122 may be considered "decommissioned.") The virtual logical workstation 232 may be a programming construct or object within the graphical configuration system 126 that receives all of the necessary parameters for commissioning and configuring a target remote workstation 122, such that, upon instantiation of an installation process, the installation process has all of the required information to commission and configure the target remote workstation 122 including, by way of example: a specified operating system (e.g., Windows 10, Windows 8, Windows 7, Windows NT, Linux, etc.), installation parameters for the operating system (e.g., how memory is allocated/reserved for various tasks and/or software components, storage partitioning, network configuration, security parameters, user accounts, etc.), the operator interface applications 124, installation parameters for the operator interface applications 124 (e.g., installation path, user accounts, display settings, I/O settings, etc.), other applications or services or files (e.g., maintenance applications, device drivers, specialized communication stacks, etc.), and the process plant configuration 128.

The process configuration engineer 104 may configure this virtual logical workstation 232 (block 206) by selecting and implementing in this virtual logical workstation 232 the various applications and services that the remote workstation 122 would host. For instance, the configuration engineer 104 may "install" on the virtual logical workstation 232 a particular operating system, the operator interface applications 124, and any other applications or features that are desirable or necessary, and may "configure" each of the operating system, operator interface applications 124, and other applications or features as desired, including setting up configuration options (e.g., user preferences, user accounts, etc.) within each. The configuration engineer 104 may also configure the virtual logical workstation 232 with the process plant configuration 128. "Installing" software, such as the operating system, the operator interface applications 124, other applications, and/or the process plant configuration 128 may, for example, including providing to the virtual logical workstation 122 a drive or network path pointing to the location of the file or files necessary for such installation or configuration. For instance, the drive or network path may point to a location on a memory device with in the configuration workstation 122 at which the installation files or configuration files are stored, may point to a location in the software repository database 164 at which the installation files or configuration files are stored, or some combination of each.

Once the virtual logical workstation 232 is fully configured the configuration engineer 104 may deploy this virtual logical workstation 232 through the communication network 136, and export the virtual logical workstation to any remote workstation 122, coupled to the communication network 136, that the process engineer 104 is tasked with configuring and commissioning. For example, in an embodiment, the configuration engineer 104 could, within the graphical configuration system 126, create a placeholder 234 for the remote workstation (block 208) that she desires to commission and could link assign or link the virtual logical workstation 232 to the placeholder 234 (block 210) to indicate that the placeholder 234 should be configured according to the virtual logical workstation 232. The configuration engineer 104 may then indicate which decommissioned remote workstation 122, present on the communication network 136, should be configured according to the placeholder 234 (block 212). In an embodiment, the configuration engineer 104 may "drag" a graphical representation (e.g., an icon) of the decommissioned remote workstation 122 to the placeholder 234 in order to indicate that the decommissioned remote workstation 122 should be configured according to the placeholder 234. The configuration engineer 104 may then initiate the commissioning and configuration of the remote workstation 122 (block 214).

Figure 5:
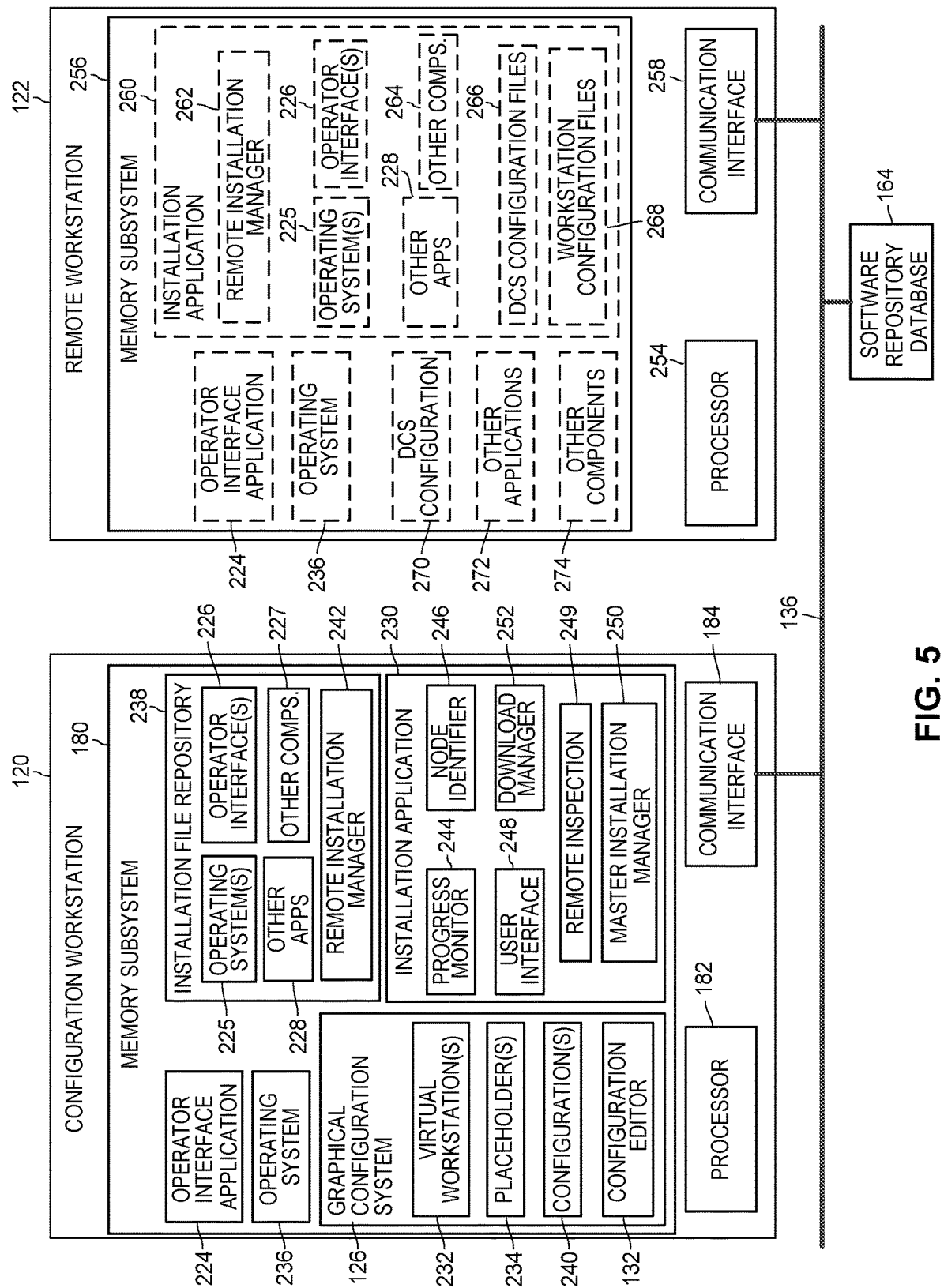
FIG. 5 is a block diagram of an example configuration workstation and an example remote station being commissioned by the configuration workstation.

FIG. 5 depicts in greater detail some of the various elements that may be present in the configuration workstation 120 and the remote workstation 122. Of course, as will be understood, the configuration workstation 120 may have an installed operating system 236 resident in its memory subsystem 180 and executing on its processor 182, and may be operable to communicate over the communication network 136 via a communication interface 184. The memory subsystem 180 may additionally store a variety of other software elements, including the graphical configuration system 126, an installation file repository 238, and an installation application 230, as described in greater detail below. In general, all of the software elements described herein comprise computer-executable instructions operable, when executed by the processor 182 to cause the processor 182 to perform various functions as described herein. When executing the instructions, the processor 182 is considered to be hardware configured to perform the specific functions specified by the computer-executable instructions and, as a result, the instructions stored in memory essentially transform a general purpose or multi-purpose processor into a processor that is configured for a specific task or to perform a specific algorithm.

As with many of the workstations operating in the DCS 100, the configuration workstation 224 and, in particular, the memory subsystem 180, may include an installed copy 224 of the operator interface application. The installed copy 224 of the operator interface application may allow the configuration engineer 104 to test the operation of various control modules and function blocks as they are created or, as should be apparent, may allow the process plant 102 to be monitored and/or controlled from the configuration workstation 120, just as though the configuration workstation 120 were one of the remote workstations 122 used by plant operators.

The graphical configuration subsystem 126 resident on the configuration workstation 120 may be executed by the processor 182 to facilitate configuration by the configuration engineer 104 of the process plant, or of various systems within the process plant, including, for example, the remote workstations 122. A configuration editor 132 of the configuration subsystem 126 may include a canvas (not shown) in which the configuration engineer may create function blocks, control modules, or other control elements and algorithms for use in controlling the process plant 102, may configure communication between process controllers 134 and field devices 144, 146 through I/O devices 148, and the like, as is generally understood by those of skill in the art. As described herein, the configuration editor 132 may also facilitate commissioning and configuration of the remote workstations 122.

As described above, the configuration engineer 104 may create within the configuration editor 132 one or more remote workstation placeholders 234. Each placeholder 234 may represent one or more operator workstations configured to control all or a portion of the process plant 102. Because different process plants may be configured in different ways, and further because a large process plant may include multiple areas, each of which may be different from or identical to other areas within the process plant, different parts of the same process plant may be controlled by different workstations, and therefore must be configured accordingly. Thus, for each different workstation configuration, and each corresponding different process plant or portion of a process plant, a specific operator workstation 122 must be configured. Further, each remote workstations 122, when configured and commissioned must be "in sync" with the remainder of the process plant under its control, including with the process controllers 134 controlling the field devices 144, 146. Thus, a fully commissioned remote workstation 122 is programmed with the configuration of the process plant (or the portion of the process plant) with which it is associated, including the address of the associated controller(s) 134, the specific device tags for the field devices 144, 146, the specific I/O configuration, etc. For this reason, the configuration engineer 104 includes in the configuration the placeholder(s) 234 for the operator workstation(s) 122 associated with a particular configuration.

As also described above, the configuration engineer 104 may create the virtual workstation 232. The virtual workstation 232 is a logical construct, within the software environment, that specifies the configuration of a contemplated remote workstation, including any one or more of the following aspects: operating system; operating system version; operating system configuration (e.g., memory allocation, user accounts, etc.); operator interface application(s); operator interface application version(s); operator interface application configuration; configuration of a process plant associated with the remote workstation; other workstation configuration parameters (e.g., drive partitions); and the like. As such, the virtual logical workstation 232 allows the configuration engineer 104 to specify the precise future configuration of an associated decommissioned workstation.

The graphical configuration system 126 may also store a variety of configurations 240 for one or more process plants 102 and/or one or more areas of a single process plant 102.

The installation file repository 238 in the memory subsystem 180 of the configuration workstation 120 may store a variety of software files necessary to configure and commission the remote workstations 122. As described above, the installation file repository 238 may store installation files 225 for one or more operating systems and/or operating system versions, may store installation files 226 for one or more operator interface applications and/or operator interface application versions, may store installation files 228 for other applications (e.g., maintenance applications, asset management applications, etc.), and may store other files or components (e.g., software drivers for various devices). The installation file repository 238 may also include installation files 242 for a remote installation manager 242 that may be installed on a remote workstation 122 to manage the remainder of the configuration and commissioning process. In embodiments, some or all of the items stored in the installation file repository 238 may be stored in the software repository database 164 instead of in the installation file repository 238.

The installation application 230 includes a variety of subroutines that facilitate commissioning and configuration of the remote workstations 122. Among these subroutines are a progress monitor subroutine 244 that monitors the configuration process as described below and reports back to the configuration engineer 104 at the configuration workstation 120, via a user interface subroutine 248, to apprise the configuration engineer 104 of the progress of the configuration and commissioning process. A node identification subroutine 246 may be operable to search the communication network 136 for remote workstation 122 nodes present on the communication network 136 and, in embodiments, may be operable to query individual nodes to determine whether each is commissioned or decommissioned. Still further, in embodiments, the node identification subroutine 246 may be operable to query individual nodes to determine, for commissioned nodes, a current configuration for each node. Alternatively or additionally, a remote inspection subroutine 249 may query identified nodes to determine whether each is commissioned or decommissioned, the software and software versions installed on each node, etc.

The user interface subroutine 248 may allow the configuration engineer 104 to initiate and control the commissioning of the remote workstations 122 by, for example, selecting a placeholder workstation 234 to commission, selecting a particular remote workstation (i.e., node) to commission as associated with the placeholder workstation 234, to select one or more configuration operations (e.g., installation of operating system, installation of operator interface application, installation of configuration files, etc.) to perform on the remote workstation 122, and to monitor the progress of an installation/configuration operation.

A master installation manager subroutine 250 manages the entirety of the installation process. The installation manager subroutine 250 may engage a download manager subroutine 252 to download necessary files to the remote workstation 122. For example, the download manager subroutine 252 may download installation files and/or configuration files to the remote workstation 122 from the installation file repository 238 and/or from the software repository database 164. The installation manager subroutine 250 may be responsible for invoking the subroutines 244, 246, 248, and 252, and for managing the overall configuration and commissioning process on the remote workstation 122.

The remote workstation 122, meanwhile, may be wholly or partially decommissioned, in embodiments. That is, the remote workstation 122 may be in one of a variety of states: it may have no operating system, it may have a minimal operating system, it may have an older version of an operating system, or it may have the operating system specified in the virtual logical workstation 232 specifying its intended configuration. Likewise, the remote workstation 122 may have an operator interface application already installed, which may be an older version or may be a different version or the same version as specified in the corresponding virtual logical workstation 232. Elements of the remote workstation 122 that, in various states may or may not be installed on the remote workstation 122, are depicted in FIG. 5 using dotted lines. Whatever the state of the remote workstation 122, the remote workstation 122 includes a processor 254, a memory subsystem 256, and a communication interface 258 facilitating communication over the communication network 136.

When instantiated by the configuration engineer (or other user) 104, the installation application 230 may instantiate the master installation manager 250, which may determine (e.g., by querying the graphical configuration system 126 or the configuration engineer 104) one or more placeholders 234 associated with virtual logical workstations 232 and, if more than one placeholder 234 is associated with a virtual logical workstation 232, may query the configuration engineer 104 to determine which placeholder workstation 234 is to be configured. The master installation manager 250 may likewise invoke the node identifier subroutine 246 to identify nodes (e.g., remote workstations 122) communicatively coupled to the communication network 136 and available for configuration/commissioning. The master installation manager 250, may offer to the configuration engineer 104, via the user interface subroutine 248, one or more nodes for configuration and, upon selection, the master installation manager 250 may proceed to configure the selected node(s) according to the selected/determined placeholder workstations 234 and, in particular, according to the associated virtual logical workstations 232. The master installation manager 250 may then invoke the download manager subroutine 252 to transfer necessary files from the installation file repository 238 and/or the software repository database 164 to the selected remote workstation(s) 122 according to the associate virtual logical workstations 232. Further, the master installation manager 250 may receive from the remote inspection subroutine 249 data regarding the present configuration of one or more of the nodes that have been selected for configuration, and may invoke the download manager subroutine 252 to transfer only the files needed to bring the selected node(s) from their present state as identified by the node identifier subroutine 249 and/or the remote inspection subroutine 249 to the desired state specified by the placeholder workstations 234 and associated virtual logical workstations 232.

In embodiments, the master installation manager 250 first transfers to the remote workstation 122 the installation files 242 for the remote installation manager. Once the installation files 242 for the remote installation manager have been transferred to the remote workstation 122, the master installation manager 240 may cause the installation files 242 to be executed on the remote workstation 122 to install an installation application 260 on the remote workstation 122. The installation application 260 may include a remote installation manager 262 operable to communicate with the master installation manager 240 throughout the configuration and commissioning of the remote workstation 122. In some embodiments, for example, the remote installation manager 262 inspects the remote workstation 122 to determine a current configuration of the remote workstation 122, and communicates the current configuration of the remote workstation 122 back to the master installation manager 240. The master installation manager 240 may then determine which processes must be completed (e.g., operating system installation, operating system update, operator interface application installation, operating interface application update, DCS configuration file installation, etc.) in order to configure and commission the remote workstation 122 according to the selected workstation placeholder 234 (and associated virtual logical workstation 232). Thereafter, the master installation manager 250 may invoke the download manager subroutine 252 to transfer from the installation file repository 238 and/or the software repository database 164 only the files necessary to complete the configuration and commissioning of the remote workstation 122.

In any event, the master installation manager 250 may cooperate with the download manager 252 and the remote installation manager 262 installed on the remote workstation 122 to ensure that necessary files are transferred to the remote workstation 122 and, as a result, the memory subsystem 256 may also have a copy of the installation files 225 for the operating system, a copy of the installation files 226 for the operator interface application, a copy of the installation files 228 for other applications, copies 264 of other components (e.g., drivers, etc.), copies 266 of the DCS configuration files necessary to configure the remote workstation 122, and, in embodiments, copies 268 of workstation configuration files that specify for the installation application 260 the desired configuration of the remote workstation 122.

The remote installation manager 262 may, using the workstation configuration files 268 and/or in cooperation with the master installation manager 250, install and configure the remote workstation 122. This may include installing or updating the operating system 236, installing or updating the operator interface application 224, installing the DCS configuration files 270, installing other applications 272, and installing any other components 274.

By cooperating and communicating with the remote installation manager 262, the master installation manager 250 may allow the configuration engineer 104 to monitor the progress of the installation via the progress monitor routine 244, and to participate in (e.g., by providing inputs to) the process by selecting nodes for configuration, selecting actions to take with respect to a selected node, confirming installation of particular software elements, confirming system restarts (if necessary) for the nodes, and the like.

Figure 6:
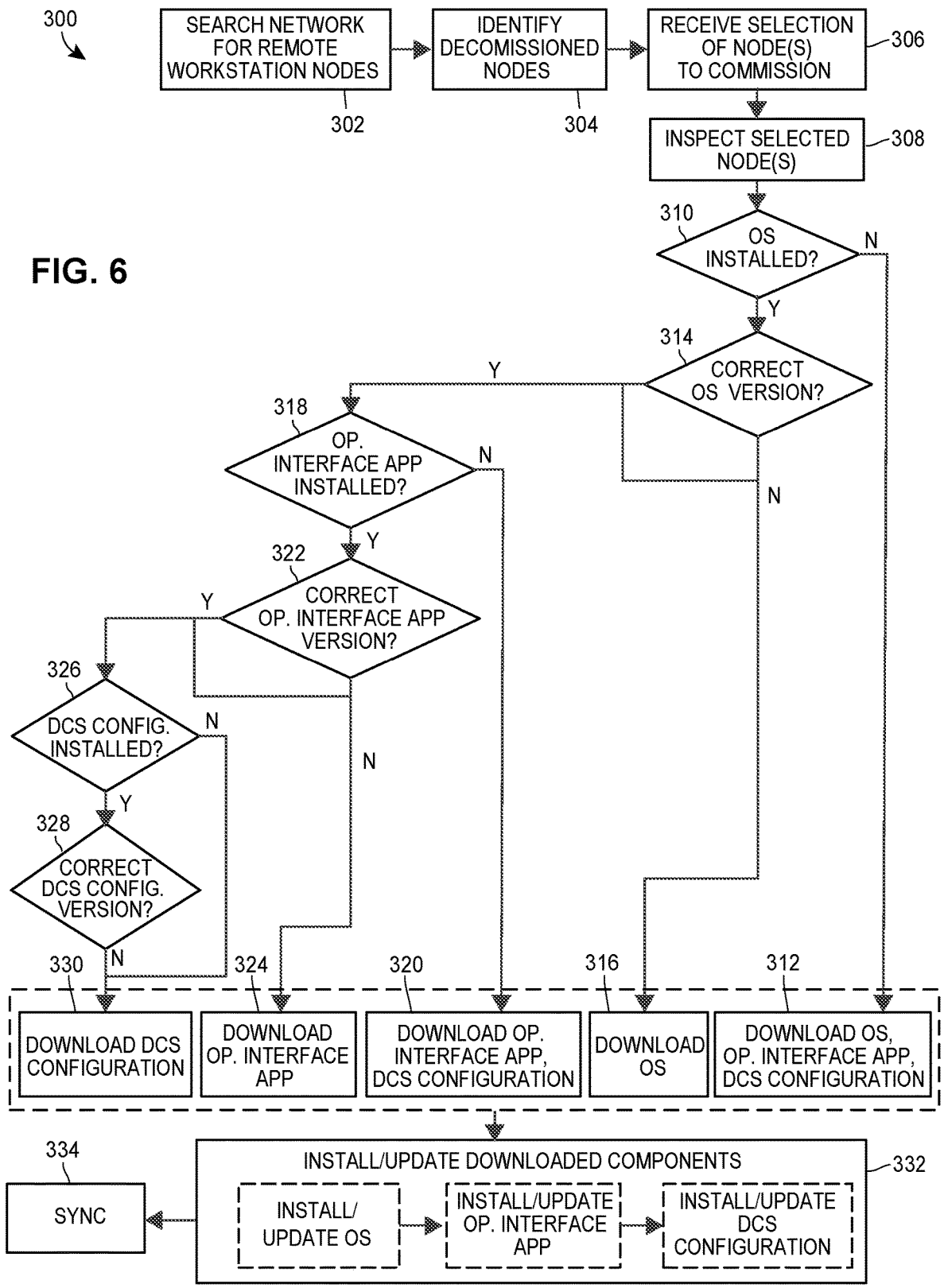
FIG. 6 is a flow chart depicting an example method for commissioning and configuration a remote workstation.

FIG. 6 is a flow chart depicting an example method 300 for commissioning and configuring a remote workstation 122. The configuration engineer 104 may instantiate the installation application 230 in any of a variety of ways. For example, in embodiments, the configuration engineer instantiates the installation application 230 by selecting the placeholder workstation 234 and clicking on a "commission workstation" menu item or button in the configuration editor 132. Upon instantiation of the installation application 230 at the configuration workstation 120, the node identifier subroutine 246 may search the communication network 136 for remote workstation nodes (block 302). In some embodiments, the node identifier subroutine 246 may be operable to determine, for each remote workstation node it identifies, whether the remote workstation 122 is commissioned or decommissioned (block 304). In such embodiments, the user interface subroutine 248 of the installation application 230 may display only nodes identified by the node identifier subroutine 246 as decommissioned nodes in some embodiments, while in others the user interface subroutine 248 of the installation application 230 may display all nodes identified by the node identifier, while distinguishing in a presented user interface (such as that of FIG. 8), whether each identified remote workstation node is commissioned or decommissioned. In still other embodiments, the node identifier subroutine 246 may not determine whether individual remote workstations 122 are commissioned or decommissioned, and may leave it to the configuration engineer 104 to make that determination when selecting a node or nodes to commission and configure.

The user interface subroutine 248 presents to the configuration engineer 104 a list of remote workstation nodes from which the configuration engineer 104 may select one or more nodes to commission and configure according to the selected placeholder workstation 234. The installation application 230 receives, via the user interface subroutine 248, a selection of the one or more nodes to commission (block 306). Having received the selection of the node(s) to commission and configure, the installation application 230 may instantiate the remote inspection subroutine 249, which is configured to communicate with each of the selected remote workstation nodes via the communication network 136 to determine the current state of each and of the software running on each. The remote inspection subroutine 249 inspects each of the selected remote workstation nodes (block 308) to determine first whether an operating system 236 is installed on the remote workstation 122 (block 310).

The installation application 230 and, in particular, the master installation manager subroutine 250 may determine that if the remote workstation 122 does not have an operating system installed (block 310), then the operator interface application 224, DCS configuration 270, other components 274, and other application 272 are also not installed. Accordingly, the master installation manager subroutine 250 may proceed to cause the download manager subroutine 252 to copy the operating system 225, the operator interface application 226, and the configuration 240 from the installation file repository 238 or the software repository database 164 to the memory subsystem 256 of the remote workstation 122 (block 312). On the other hand, if the remote inspection subroutine 249 determines that the operating system 236 is installed on the remote workstation 122 (block 310), then the remote inspection subroutine 249 may determine whether the installed operating system 236 is the correct version (i.e., the version specified by the virtual logical workstation 232 associated with the placeholder 234) (block 314). If the remote inspection subroutine 249 determines that the operating system 236 installed on the remote workstation 122 is not the correct version, then the master installation manager subroutine 250 may cause the download manager subroutine 252 to copy the operating system 225 from the installation file repository 238 or the software repository database 164 to the memory subsystem 256 of the remote workstation 122 (block 316).

If the remote inspection subroutine 249 determines that the operating system 236 is installed on the remote workstation 122 (block 310), the remote inspection subroutine 249 may proceed, regardless of whether the operating system 236 is the correct version (block 314), to determine whether the operator interface application 224 is installed on the remote workstation 122 (block 318). The installation application 230 and, in particular, the master installation manager subroutine 250 may determine that if the remote workstation 122 does not have the operator interface application 224 installed (block 318), then the DCS configuration 270 is also not installed. Accordingly, the master installation manager subroutine 250 may proceed to cause the download manager subroutine 252 to copy the operator interface application 226, and the configuration 240 from the installation file repository 238 or the software repository database 164 to the memory subsystem 256 of the remote workstation 122 (block 320). On the other hand, if the remote inspection subroutine 249 determines that the operator interface application 224 is installed on the remote workstation 122 (block 318), then the remote inspection subroutine 249 may determine whether the installed operator interface application 224 is the correct version (i.e., the version specified by the virtual logical workstation 232 associated with the placeholder 234) (block 322). If the remote inspection subroutine 249 determines that the operator interface application 224 installed on the remote workstation 122 is not the correct version, then the master installation manager subroutine 250 may cause the download manager subroutine 252 to copy the operator interface application 226 from the installation file repository 238 or the software repository database 164 to the memory subsystem 256 of the remote workstation 122 (block 324).

If the remote inspection subroutine 249 determines that the operator interface application 224 is installed on the remote workstation 122 (block 318), the remote inspection subroutine 249 may proceed, regardless of whether the operator interface application 224 is the correct version (block 322), to determine whether the DCS configuration 270 is installed on the remote workstation 122 (block 326) and, if so, whether the DCS configuration 270 is the correct version (i.e., the version specified by the virtual logical workstation 232 associated with the placeholder 234) (block 328). If the DCS configuration 270 is not installed, or if it is installed but is not the correct version, the installation application 230 and, in particular, the master installation manager subroutine 250 may proceed to cause the download manager subroutine 252 to copy the DCS configuration 240 from the installation file repository 238 or the graphical configuration system 126 or the software repository database 164 to the memory subsystem 256 of the remote workstation 122 (block 330).

The remote inspection subroutine 249 may perform similar inquiries to determine whether other applications 272, other components 274, and other configuration parameters are appropriate installed/configured on the remote workstation 122 and, as should be understood, may be downloaded or queued for download as needed. The master installation manager subroutine 250 may further cause the download manager subroutine 252 to download to the remote workstation 122 a remote installation manager subroutine 262 to manage locally the installation of various components on the remote workstation 122.

The master installation manager subroutine 250 on the configuration workstation 120 may cooperate with the remote installation manager subroutine 262 on the remote workstation 122 to specify the components and configurations thereof for installation/update on the remote workstation 122. Thereafter, the remote installation manager subroutine 262 may install and/or update the operating system 236, the operator interface application 224, the DCS configuration 270, and any other applications 272 and components 274 necessary (block 332). While it should be clear, the remote installation manager 262 generally installs or updates the operating system 224 prior to installing or updating the operator interface application 224, and generally installs or updates the operator interface application 224 prior to installing or updating the DCS configuration files 270.

The remote installation manager subroutine 262 may communicate with the installation application 230 and, in particular, with the progress monitor subroutine 244 of the installation application 230 so that the configuration engineer 104 may monitor the progress of the commissioning and configuration of the remote workstation 122.

Upon completion of the installation/update and configuration activities (block 332), the master installation manager subroutine 250 may re-instantiate the remote inspection subroutine 249 or may otherwise inspect the remote workstation 122 to ensure that the current configuration of the remote workstation 122 matches that specified in the virtual logical workstation 232 associated with the placeholder 234 for the remote workstation 122. If the remote workstation 122 is, in fact, properly configured, the master installation manager subroutine 250 may communicate to the configuration editor 132 that the physical remote workstation 122 is "in sync" with the virtual logical workstation 232, and the physical remote workstation 122 will be immediately useable to control the process plant 102 according to the process plant configuration.

The method of remotely commissioning remote workstation that is presented in this disclosure provides an efficient and convenient way for the user, who could be for example a process configuration engineer according to an example, to remotely configure multiple remote workstations without having to ever physically visit those remote workstations. The user can accomplish the same objective of configuring a remote workstation through working remotely from the configuration workstation and interfacing with all the multiple remote workstations through interaction with just one single machine which is the configuration workstation.

The following list of aspects reflects a variety of the embodiments explicitly contemplated by the present application. Those of ordinary skill in the art will readily appreciate that the aspects below are neither limiting of the embodiments disclosed herein, nor exhaustive of all of the embodiments conceivable from the disclosure above, but are instead meant to be exemplary in nature.

1. A system for facilitating remote commissioning of selected workstations in a process control plant, the system comprising: a plurality of process control field devices operating to process physical materials in the process plant to produce a product; a process controller coupled to the plurality of process control field devices, the process controller configured to receive first signals from the process control field devices and to send control signals to the process control field devices; a communication network; a configuration workstation coupled to the communication network, the configuration workstation comprising a processor and a memory coupled to the processor, the memory storing machine-readable instructions, executable by the processor to: provide a graphical configuration system operable by a user to create control modules and function blocks for controlling the process control field devices, and to download the control modules and function blocks to the process controller to implement control of the process control field devices; receive from a user a specified configuration for a workstation coupled to the communication network; receive a selection of the workstation from a plurality of workstations coupled to the communication network; and cause the selected workstation to be configured according to the specified configuration, such that the workstation is operable to communicate with the process controller to implement configuration, operational, and/or maintenance functions within the process control plant.

2. A system according to aspect 1, wherein the machine-readable instructions are executable by the processor to cause the selected workstation to be configured such that the workstation becomes an operator workstation operable to control the process control field devices and the receive operational data of the process control plant.

3. A system according to aspect 1, wherein: the instructions executable by the processor to receive from the user the specified configuration for the selected workstation coupled to the communication network are executable to create a virtual logical workstation by selecting applications and services for installation on the selected workstation.

4. A system according to aspect 3, wherein the instructions executable by the processor to receive from the user the specified configuration for the selected workstation coupled to the communication network are further executable to associate the virtual logical workstation with a placeholder workstation in the graphical configuration system.

5. A system according to aspect 4, wherein the memory of the configuration workstation further stores machine-readable instructions, executable by the processor to: transfer to the selected workstation, via the communication network, one or more elements for installation on the selected workstation; cause the installation of the one or more elements on the selected workstation; complete the installation of the one or more elements on the selected workstation remotely from the configuration workstation such that, upon completion, the selected workstation is operable to communicate with the process controller to effect control the process control field devices.

6. A system according to aspect 1, wherein the memory of the configuration workstation further stores machine-readable instructions, executable by the processor to: transfer to the selected workstation, via the communication network, one or more elements for installation on the selected workstation; cause the installation of the one or more elements on the selected workstation; complete the installation of the one or more elements on the selected workstation remotely from the configuration workstation such that, upon completion, the selected workstation is operable to communicate with the process controller to effect control the process control field devices.

7. A system according to any one of aspects 1 to 6, wherein the specified configuration for the selected workstation comprises: a specified operating system; a specified operating system version; a specified operator interface application, the operator interface application operable to facilitate control of the process plant via the process controller; a specified operator interface application version; a specified process plant configuration.

8. A system according to any one of aspects 1 to 7, wherein the memory of the configuration workstation further stores machine-readable instructions, executable by the processor to identify operator workstations communicatively coupled to the configuration workstation by the communication network.

9. A system according to aspect 8, wherein the memory of the configuration workstation further stores machine-readable instructions, executable by the processor to inspect identified workstations to determine a current configuration of each.

10. A system according to aspect 1, wherein the instructions executable by the processor to cause the workstation to be configured according to the specified configuration comprise instructions executable to cause the processor to: install on the selected workstation an operating system; install on the selected workstation an operator interface application, the operator interface application operable to facilitate control of the process plant via the process controller; and/or install on the selected workstation a process plant configuration.

11. A method for remotely commissioning an operator workstation in a process control plant, the method comprising: creating, in a configuration editor of a graphical configuration system operating on a configuration workstation, a process configuration for the process control plant, the configuration for the process plant specifying a process controller, a plurality of process control field devices, and a control strategy for implementation by the process controller to control the plurality of process control field devices; specifying, in the configuration editor, a configuration of an operator workstation to be commissioned to control the process plant; searching a communication network communicatively coupled to the configuration workstation to identify one or more decommissioned operator workstations; receiving a selection of one of the decommissioned operator workstations identifying the selected decommissioned operator workstation as the operator workstation to be commissioned; causing the selected decommissioned operator workstation to be configured according to the specified configuration of the operator workstation to be commissioned, such that the operator workstation is operable to communicate with the process controller to implement control of the process control field devices and to receive operational data of the process control plant.

12. A method according to aspect 11, wherein specifying a configuration of the operator workstation to be commissioned comprises: creating in the configuration editor a virtual logical workstation.

13. A method according to aspect 12, wherein creating the virtual logical workstation comprises specifying for the virtual logical workstation: a specified operating system; a specified operating system version; a specified operator interface application, the operator interface application operable to facilitate control of the process plant via the process controller; a specified operator interface application version; a specified process plant configuration.

14. A method according to any one of aspects 11 to 13, wherein creating a process configuration for the process control plant comprises creating a placeholder workstation representing in the process configuration the operator workstation to be commissioned to control the process plant.

15. A method according to either aspect 12 or aspect 13, wherein creating a process configuration for the process control plant comprises creating a placeholder workstation representing in the process configuration the operator workstation to be commissioned to control the process plant, and further comprising associating the virtual logical workstation with the placeholder workstation.

16. A method according to any one of aspects 11 to 15, wherein causing the selected decommissioned operator workstation to be configured according to the specified configuration of the operator workstation to be commissioned comprises inspecting the selected decommissioned operator workstation to determine at least one of: whether an operating system is installed on the decommissioned operator workstation; a version of an operating system installed on the decommissioned operator workstation; whether an operator interface application is installed on the decommissioned operator workstation; a version of an operator interface application installed on the decommissioned operator workstation; and whether the process configuration for the process control plant is installed on the decommissioned operator workstation.

17. A method according to any one of aspects 11 to 16, wherein causing the selected decommissioned operator workstation to be configured according to the specified configuration of the operator workstation to be commissioned comprises transferring to the decommissioned operator workstation at least one of: installation files for an operating system to install on the decommissioned operator workstation; installation files for an operator interface application to install on the decommissioned operator workstation; and installation files for the process configuration for the process control plant to install on the decommissioned operator workstation.

18. A method according to any one of aspects 11 to 16, wherein causing the selected decommissioned operator workstation to be configured according to the specified configuration of the operator workstation to be commissioned comprises: transfer to the decommissioned operator workstation, via the communication network, one or more elements for installation on the decommissioned operator workstation; cause the installation of the one or more elements on the decommissioned operator workstation; complete the installation of the one or more elements on the decommissioned operator workstation remotely from the configuration workstation such that, upon completion, the operator workstation is commissioned and operable to communicate with the process controller to effect control the process control field devices.

We claim:

1. A system for facilitating remote commissioning of selected workstations in a process control plant, the system comprising:
a plurality of process control field devices operating to process physical materials in the process plant to produce a product;
a process controller coupled to the plurality of process control field devices, the process controller configured to receive first signals from the process control field devices and to send control signals to the process control field devices;
a communication network;
a configuration workstation coupled to the communication network, the configuration workstation comprising a processor and a memory coupled to the processor, the memory storing machine-readable instructions, executable by the processor to:
provide a graphical configuration system operable by a user to create control modules and function blocks for controlling the process control field devices, and to download the control modules and function blocks to the process controller to implement control of the process control field devices;
receive from a user a specified configuration for a workstation coupled to the communication network;
receive a selection of the workstation from a plurality of workstations coupled to the communication network; and
cause the selected workstation to be configured according to the specified configuration, such that the workstation is operable to communicate with the process controller to implement configuration, operational, and/or maintenance functions within the process control plant,
wherein the instructions executable by the processor to receive from the user the specified configuration for the selected workstation coupled to the communication network are executable to create a virtual logical workstation by selecting applications and services for installation on the selected workstation.

2. A system according to claim 1, wherein the machine-readable instructions are executable by the processor to cause the selected workstation to be configured such that the workstation becomes an operator workstation operable to control the process control field devices and the receive operational data of the process control plant.

3. A system according to claim 1, wherein the instructions executable by the processor to receive from the user the specified configuration for the selected workstation coupled to the communication network are further executable to associate the virtual logical workstation with a placeholder workstation in the graphical configuration system.

4. A system according to claim 3, wherein the memory of the configuration workstation further stores machine-readable instructions, executable by the processor to:
transfer to the selected workstation, via the communication network, one or more elements for installation on the selected workstation;
cause the installation of the one or more elements on the selected workstation;
complete the installation of the one or more elements on the selected workstation remotely from the configuration workstation such that, upon completion, the selected workstation is operable to communicate with the process controller to effect control the process control field devices.

5. A system according to claim 1, wherein the memory of the configuration workstation further stores machine-readable instructions, executable by the processor to:
transfer to the selected workstation, via the communication network, one or more elements for installation on the selected workstation;
cause the installation of the one or more elements on the selected workstation;
complete the installation of the one or more elements on the selected workstation remotely from the configuration workstation such that, upon completion, the selected workstation is operable to communicate with the process controller to effect control the process control field devices.

6. A system according to claim 1, wherein the specified configuration for the selected workstation comprises:
a specified operating system;
a specified operating system version;
a specified operator interface application, the operator interface application operable to facilitate control of the process plant via the process controller;
a specified operator interface application version;
a specified process plant configuration.

7. A system according to claim 1, wherein the memory of the configuration workstation further stores machine-readable instructions, executable by the processor to identify operator workstations communicatively coupled to the configuration workstation by the communication network.

8. A system according to claim 7, wherein the memory of the configuration workstation further stores machine-readable instructions, executable by the processor to inspect identified workstations to determine a current configuration of each.

9. A system according to claim 1, wherein the instructions executable by the processor to cause the workstation to be configured according to the specified configuration comprise instructions executable to cause the processor to:
install on the selected workstation an operating system;
install on the selected workstation an operator interface application, the operator interface application operable to facilitate control of the process plant via the process controller; and/or
install on the selected workstation a process plant configuration.

10. A method for remotely commissioning an operator workstation in a process control plant, the method comprising:
creating, in a configuration editor of a graphical configuration system operating on a configuration workstation, a process configuration for the process control plant, the configuration for the process plant specifying a process controller, a plurality of process control field devices, and a control strategy for implementation by the process controller to control the plurality of process control field devices;
specifying, in the configuration editor, a configuration of an operator workstation to be commissioned to control the process plant;
searching a communication network communicatively coupled to the configuration workstation to identify one or more decommissioned operator workstations;

receiving a selection of one of the decommissioned operator workstations identifying the selected decommissioned operator workstation as the operator workstation to be commissioned;

causing the selected decommissioned operator workstation to be configured according to the specified configuration of the operator workstation to be commissioned, such that the operator workstation is operable to communicate with the process controller to implement control of the process control field devices and to receive operational data of the process control plant, wherein specifying a configuration of the operator workstation to be commissioned comprises creating in the configuration editor a virtual logical workstation.

11. A method according to claim 10, wherein creating the virtual logical workstation comprises specifying for the virtual logical workstation:
- a specified operating system;
- a specified operating system version;
- a specified operator interface application, the operator interface application operable to facilitate control of the process plant via the process controller;
- a specified operator interface application version;
- a specified process plant configuration.

12. A method according to claim 10, wherein creating a process configuration for the process control plant comprises creating a placeholder workstation representing in the process configuration the operator workstation to be commissioned to control the process plant.

13. A method according to claim 10, wherein creating a process configuration for the process control plant comprises creating a placeholder workstation representing in the process configuration the operator workstation to be commissioned to control the process plant, and further comprising associating the virtual logical workstation with the placeholder workstation.

14. A method according to claim 10, wherein causing the selected decommissioned operator workstation to be configured according to the specified configuration of the operator workstation to be commissioned comprises inspecting the selected decommissioned operator workstation to determine at least one of:
- whether an operating system is installed on the decommissioned operator workstation;
- a version of an operating system installed on the decommissioned operator workstation;
- whether an operator interface application is installed on the decommissioned operator workstation;
- a version of an operator interface application installed on the decommissioned operator workstation; and
- whether the process configuration for the process control plant is installed on the decommissioned operator workstation.

15. A method according to claim 10, wherein causing the selected decommissioned operator workstation to be configured according to the specified configuration of the operator workstation to be commissioned comprises transferring to the decommissioned operator workstation at least one of:
- installation files for an operating system to install on the decommissioned operator workstation;
- installation files for an operator interface application to install on the decommissioned operator workstation; and
- installation files for the process configuration for the process control plant to install on the decommissioned operator workstation.

16. A method according to claim 10, wherein causing the selected decommissioned operator workstation to be configured according to the specified configuration of the operator workstation to be commissioned comprises:
- transferring to the decommissioned operator workstation, via the communication network, one or more elements for installation on the decommissioned operator workstation;
- causing the installation of the one or more elements on the decommissioned operator workstation;
- completing the installation of the one or more elements on the decommissioned operator workstation remotely from the configuration workstation such that, upon completion, the operator workstation is commissioned and operable to communicate with the process controller to effect control the process control field devices.

17. A method for remotely commissioning an operator workstation in a process control plant, the method comprising:

creating, in a configuration editor of a graphical configuration system operating on a configuration workstation, a process configuration for the process control plant, the configuration for the process plant specifying a process controller, a plurality of process control field devices, and a control strategy for implementation by the process controller to control the plurality of process control field devices;

specifying, in the configuration editor, a configuration of an operator workstation to be commissioned to control the process plant;

searching a communication network communicatively coupled to the configuration workstation to identify one or more decommissioned operator workstations;

receiving a selection of one of the decommissioned operator workstations identifying the selected decommissioned operator workstation as the operator workstation to be commissioned;

causing the selected decommissioned operator workstation to be configured according to the specified configuration of the operator workstation to be commissioned, such that the operator workstation is operable to communicate with the process controller to implement control of the process control field devices and to receive operational data of the process control plant, wherein creating a process configuration for the process control plant comprises creating a placeholder workstation representing in the process configuration the operator workstation to be commissioned to control the process plant.

18. A method according to claim 17, wherein specifying a configuration of the operator workstation to be commissioned comprises creating in the configuration editor a virtual logical workstation.

19. A method according to claim 18, further comprising associating the virtual logical workstation with the placeholder workstation.

20. A method according to claim 17, wherein causing the selected decommissioned operator workstation to be configured according to the specified configuration of the operator workstation to be commissioned comprises inspecting the selected decommissioned operator workstation to determine at least one of:
- whether an operating system is installed on the decommissioned operator workstation;
- a version of an operating system installed on the decommissioned operator workstation;

whether an operator interface application is installed on the decommissioned operator workstation;

a version of an operator interface application installed on the decommissioned operator workstation; and whether the process configuration for the process control plant is installed on the decommissioned operator workstation.

21. A method according to claim 17, wherein causing the selected decommissioned operator workstation to be configured according to the specified configuration of the operator workstation to be commissioned comprises transferring to the decommissioned operator workstation at least one of:

installation files for an operating system to install on the decommissioned operator workstation;

installation files for an operator interface application to install on the decommissioned operator workstation; and installation files for the process configuration for the process control plant to install on the decommissioned operator workstation.

22. A method according to claim 17, wherein causing the selected decommissioned operator workstation to be configured according to the specified configuration of the operator workstation to be commissioned comprises:

transferring to the decommissioned operator workstation, via the communication network, one or more elements for installation on the decommissioned operator workstation;

causing the installation of the one or more elements on the decommissioned operator workstation;

completing the installation of the one or more elements on the decommissioned operator workstation remotely from the configuration workstation such that, upon completion, the operator workstation is commissioned and operable to communicate with the process controller to effect control the process control field devices.

* * * * *

UNITED STATES PATENT AND TRADEMARK OFFICE
CERTIFICATE OF CORRECTION

PATENT NO. : 11,314,216 B2
APPLICATION NO. : 16/863527
DATED : April 26, 2022
INVENTOR(S) : Christopher Arceno et al.

Page 1 of 1

It is certified that error appears in the above-identified patent and that said Letters Patent is hereby corrected as shown below:

In the Drawings

At Fig. 3, Sheet 3 of 5, Tag "224", Line 1, "(OPERATORINTERFACE)" should be -- (OPERATOR INTERFACE) --.

At Fig. 6, Sheet 5 of 5, Tag "304", Line 2, "DECOMISSIONED" should be -- DECOMMISSIONED --.

In the Specification

At Column 2, Line 60, "remote" should be -- remotely --.

At Column 6, Line 62, "a" should be -- of a --.

At Column 6, Lines 63-64, "DESCRYPTION" should be -- DESCRIPTION --.

At Column 9, Line 19, "DeltaV" should be -- DeltaV™ --.

At Column 12, Line 50, "with in" should be -- within --.

At Column 19, Line 17, "appropriate" should be -- appropriately --.

Signed and Sealed this
Twenty-fifth Day of November, 2025

John A. Squires
*Director of the United States Patent and Trademark Office*